June 4, 1929.  W. P. VACHON  1,715,964
APPARATUS FOR MAKING ENDLESS BELTS
Filed Dec. 31, 1927   3 Sheets-Sheet 3
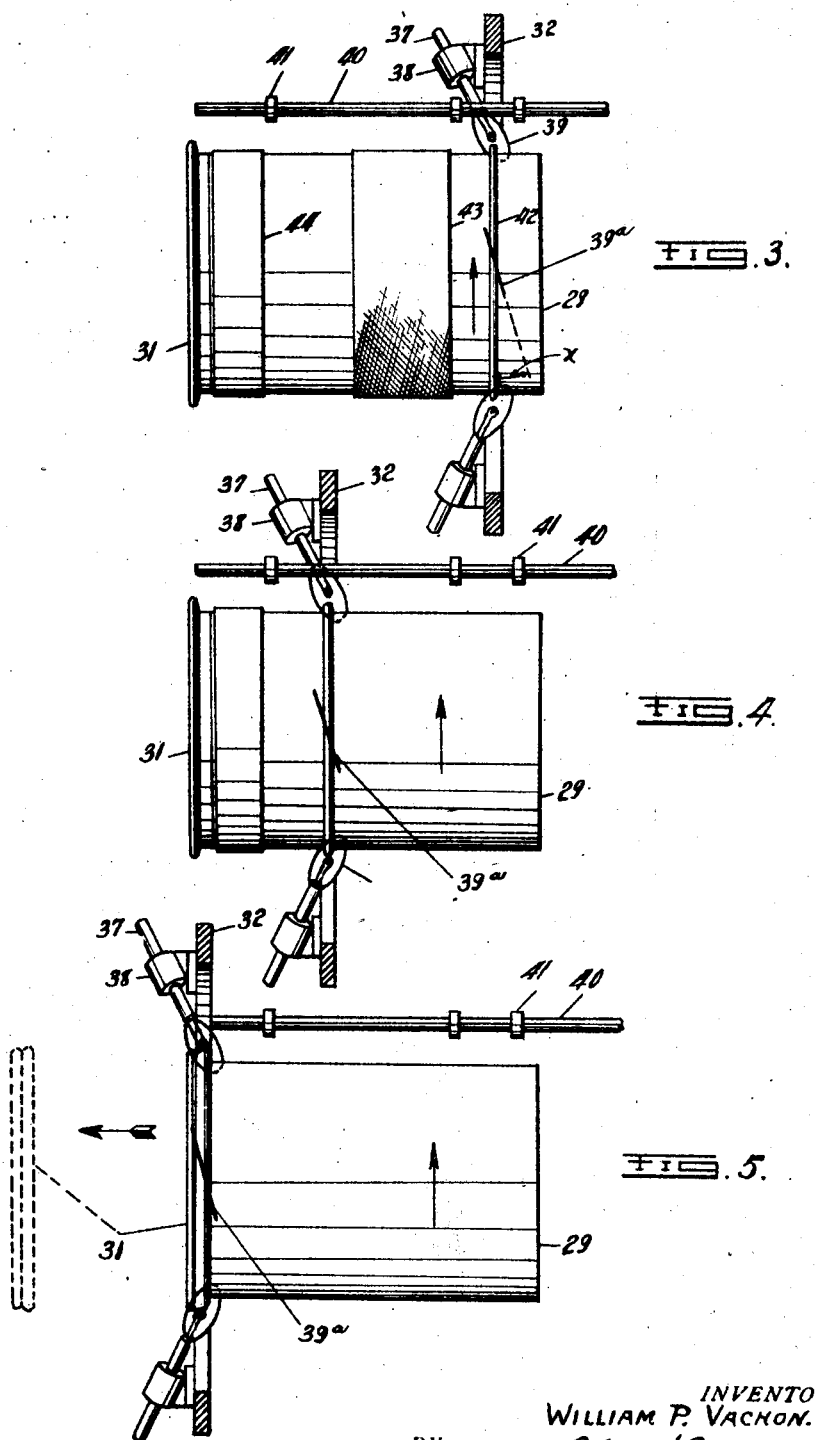
INVENTOR
WILLIAM P. VACHON.
BY
Ely & Barrow
ATTORNEYS.

Patented June 4, 1929.

1,715,964

UNITED STATES PATENT OFFICE.

WILLIAM P. VACHON, OF AKRON, OHIO, ASSIGNOR TO THE FIRESTONE TIRE AND RUBBER COMPANY, OF AKRON, OHIO, A CORPORATION OF OHIO.

APPARATUS FOR MAKING ENDLESS BELTS.

Application filed December 31, 1927. Serial No. 243,906.

This invention relates to machines for making endless belts, particularly power transmission belts such as used for driving automobile fans, washing machines, electric refrigerators and the like.

An object of the invention is to devise a machine comprising a rotatable drum on which the belt building strips may be assembled in proper relation, stitched, and rolled into circular form. A further object is to devise a stitching and rolling mechanism for forming flat strips into a compact integral annular structure. Another object is to devise means for transferring the assembled belts from the building drum to a form on which the belt is to be vulcanized.

The foregoing and other objects are obtained by the structure illustrated in the accompanying drawings and described below. It is to be understood that the invention is not limited to the specific form thereof disclosed herein.

Of the accompanying drawings,

Figure 3 is a plan detail illustrating the first stitching operation;

Figure 4 is a similar view showing the second stitching operation; and

Figure 5 is a similar view showing the third stitching operation.

Figure 1:
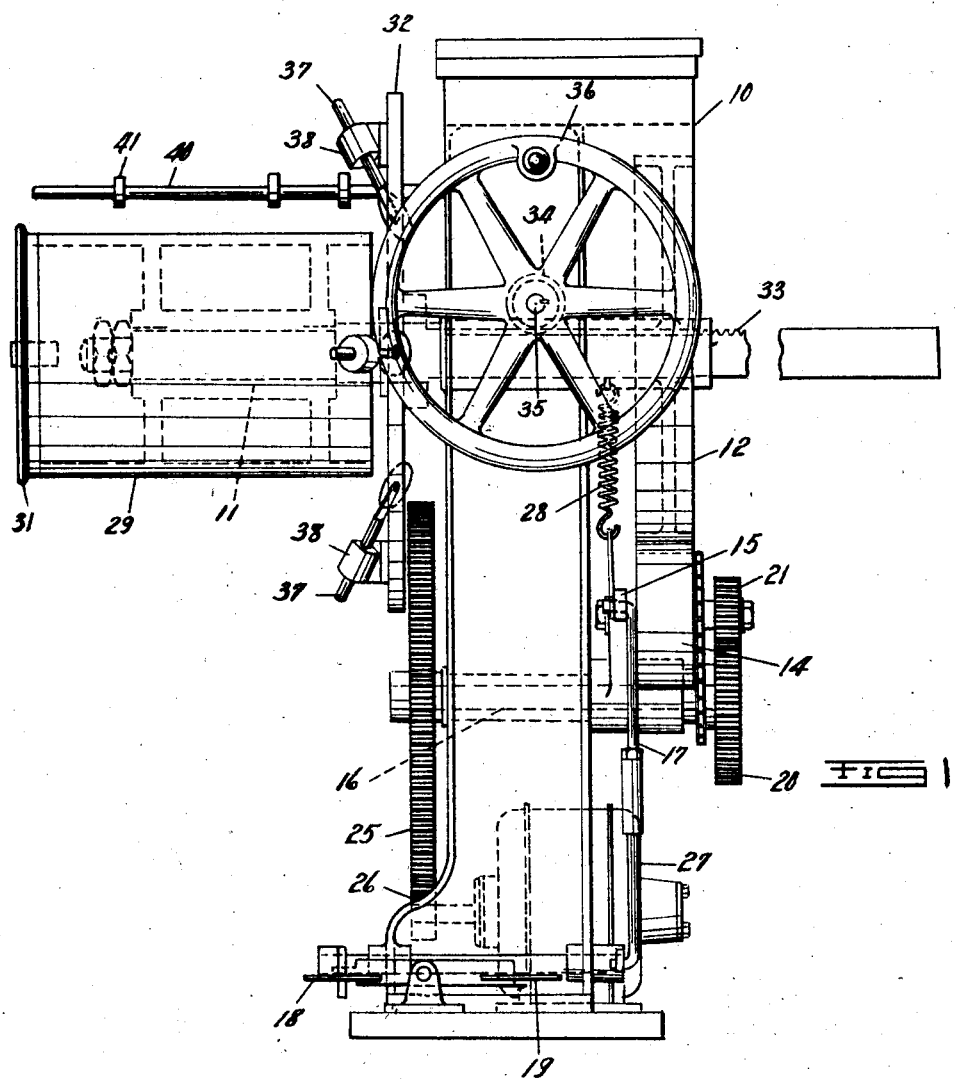
Figure 1 is a side elevation of a machine embodying the principles of the invention.
Figure 2:
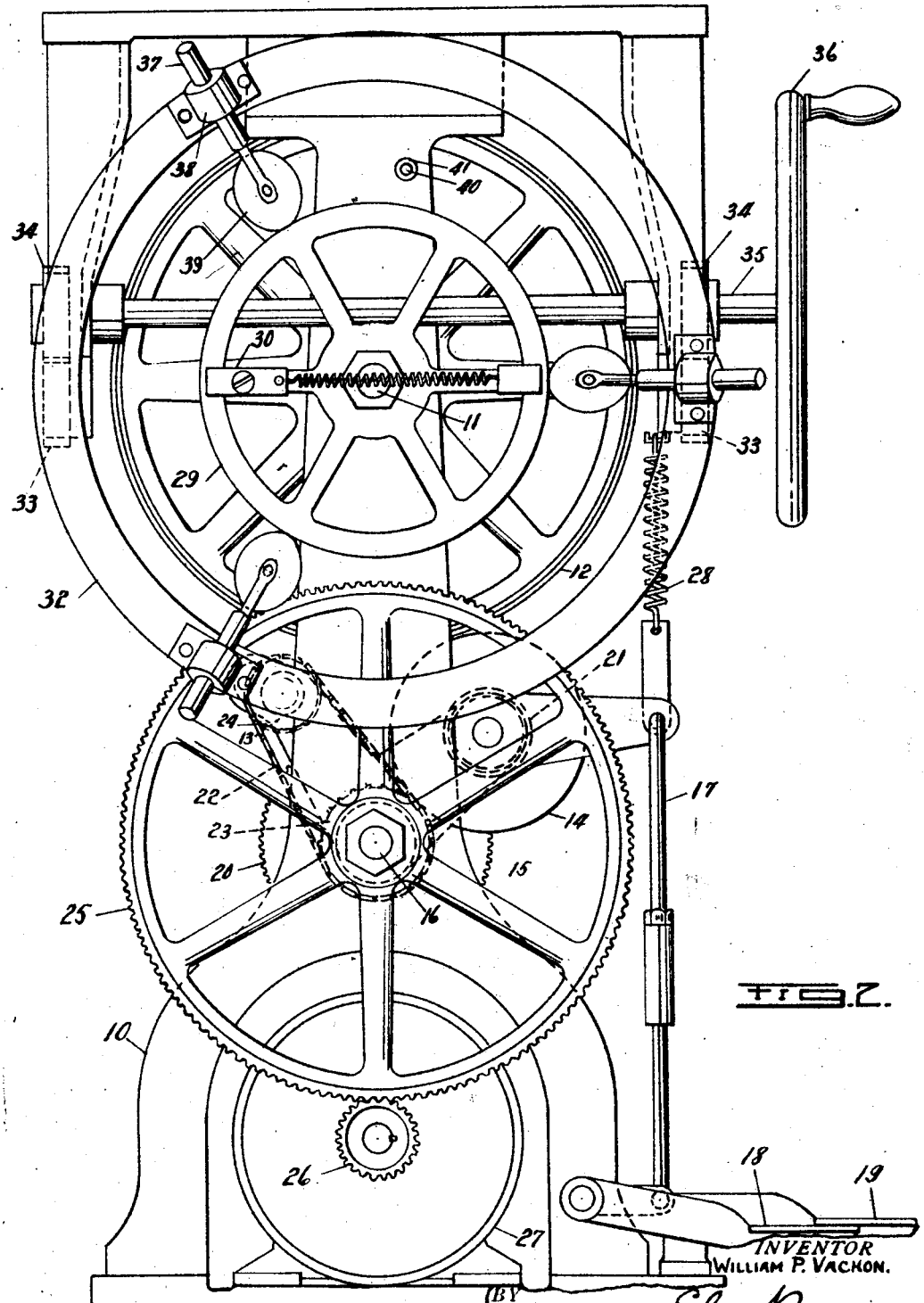
Figure 2 is an end elevation thereof on a slightly enlarged scale.

Referring to the drawings, the numeral 10 designates a frame for supporting the mechanism of the belt making machine. The shaft 11, journaled in the frame, is driven by friction pulley 12, which is in turn selectively driven by either of friction wheels 13 or 14. These friction wheels are journaled in a shifting bracket 15, hinged on shaft 16, and adapted to be rocked by connecting rod 17, actuated through suitable connecting means by pedals 18 and 19. Gear 20 keyed to shaft 16 meshes with pinion 21 fixed to wheel 14 to drive the latter at high speed, while a chain 22 trained over sprockets 23 and 24 respectively fixed to shaft 16 and to wheel 13, drives the latter at low speed in a reversed direction. Shaft 16 is rotated by gear 25 meshed with pinion 26 driven by motor 27 or any other suitable source of power, the directions of the driving means being such that pressing pedal 18 will cause shaft 11 to be rotated slowly in a counter-clockwise direction, as viewed in Figure 2, while pressing pedal 19 will cause a rapid clockwise rotation of shaft 11. A spring 28 attached to the frame and to bracket 15, counterbalances the latter and maintains it in a neutral position when the pedals are not operated.

A cylindrical drum 29 is fixed to shaft 11, and is provided on its outer end with a spring-operated latch 30 for aligning and attaching a mold ring 31 to the drum. An annular member 32, concentrically disposed with respect to the drum, is mounted on a pair of racks 33 slidable in frame 10. Pinions 34 meshing with the racks, are fixed to shaft 35, which is rotated by hand wheel 36 to reciprocate annular member 32 axially across the drum. A plurality of stitcher arms 37 are clamped in bearings 38 on annular member 32 at an angle extending inwardly of the transverse plane of said member, and are radially and angularly adjustable in said bearings to bring stitcher discs 39 pivoted on the inner ends of the stitcher arms, into engagement with the cylindrical surface of the drum and to turn the discs at an angle to the transverse plane of the drum. A guide rod 40 projects from the frame 10 across the drum and is provided with a number of collars 41 to assist in guiding the various belt building strips 42, 43 and 44 onto the drum.

In the operation of the machine for making belts, a plurality of strips of rubberized cords or fabric are guided onto the drum and wound thereabout a desired number of times, the drum being rotated slowly by pressing pedal 18. As illustrated in Figures 3, 4 and 5 one form of belt comprises a strip of rubberized cords 42, a band of rubberized fabric 43, and a fabric and rubber strip 44. After these strips are applied on the drum, the high speed pedal 19 is pressed and at the same time the stitchers are reciprocated across the drum by turning hand wheel 36. As the stitcher discs come into contact with the first strip, they turn over the edge of the latter and roll the strip upon itself, as shown in Figure 3, forming a compact annulus or core, circular in cross-section. This annulus is next rolled across the drum to further compact the same until it comes into contact with strip 43 to which it adheres tightly due to the tacky nature of the uncured rubber coating and then rolls up with strip 43 as illustrated in Figure 4. Continued reciprocation of the stitches rolls the belt across the drum, stitches the third strip 44 about the core of the belt, and finally rolls the belt over onto mold ring 31, as illustrated in Figure 5. The rolling action produced is due in part to the angular relation of the stitcher discs with respect to the drum and the fabric. Figures 3, 4 and 5 illustrate the forward disc diagrammatically as a line 39ª making an acute angle $x$ with the edge of the fabric, so that the trailing portion of the disc is directed toward the fabric further than the leading portion as the drum is rotated in the direction indicated by the arrow. The operating surface of the disc is thus presented at an acute angle to the edge of the fabric and turns the latter upon itself in the manner of a plow turning a furrow. The rotation of the discs by the drum and the fabric also assists in the turning of the fabric as the trailing portions of the discs engage the edge of the fabric. It will be understood, however, that the invention is not limited to rotatable stitching discs since a fixed shoe having an operating surface directed at an acute angle toward the edge of the fabric, will function in a similar manner. The reciprocation of the stitchers across the drum, the rolling up of the plies of the belt, and the rolling of the latter onto the mold ring are accomplished in one continuous stroke, affording a very speedy operation. The mold ring is then removed from the drum and associated with a number of similar rings to vulcanize the belts thereon. Where further operations are to be performed on the belt before vulcanization, such as expanding to take out the "stretch", the mold ring is not attached to the drum, the belt simply being pushed off the drum by the stitchers.

The drawings illustrate three stitcher discs for stitching and rolling the belt plies, but one or any desired number may be employed as determined by experiment to be most effective. Modifications of the structure herein disclosed may be resorted to without departing from the spirit of the invention or the scope thereof as defined by the appended claims.

What is claimed is:

1. Apparatus for building endless fabric ply belts, comprising a rotatable drum adapted to have fabric strips applied circumferentially thereabout, a mold ring detachably secured to the outer end of said drum, a stitcher holder mounted to reciprocate longitudinally across the drum, a plurality of stitcher discs carried by said holder and approximately in engagement with said drum, said discs being angularly disposed to the transverse plane of the drum and the periphery of each disc being turned at an angle to the circumference of the drum, and means for reciprocating said stitcher discs across the drum to stitch and roll the fabric strips laterally along the drum as the latter is rotated, to consolidate the fabric strips into convolute plies and to roll the assembled belt onto the mold ring.

2. Apparatus for building endless fabric ply belts, comprising a rotatable drum adapted to have fabric strips applied circumferentially thereabout, a mold ring detachably secured to the outer end of said drum, a plurality of stitcher discs mounted to reciprocate longitudinally across the drum and approximately in engagement with said drum, said discs being angularly disposed to the transverse plane of the drum and the periphery of each disc being turned at an angle to the circumference of the drum, and means for reciprocating said stitcher discs across the drum to stitch and roll the fabric strips laterally along the drum as the latter is rotated, to consolidate the fabric strips into convolute plies and to roll the assembled belt onto the mold ring.

3. Apparatus for building endless fabric ply belts, comprising a rotatable drum adapted to have fabric strips applied circumferentially thereabout, a mold ring detachably secured to the outer end of said drum, a plurality of stitchers mounted to reciprocate longitudinally across the drum and approximately in engagement with said drum, said stitchers being angularly disposed to the transverse plane of the drum, and means for reciprocating said stitchers across the drum to stitch and roll the fabric strips laterally along the drum as the latter is rotated, to consolidate the fabric strips into convolute plies and to roll the assembled belt onto the mold ring.

4. Apparatus for building endless fabric ply belts, comprising a rotatable drum, means for guiding fabric strips circumferentially about said drum in axially spaced relation, a plurality of stitchers mounted to reciprocate longitudinally across the drum and approximately in engagement with said drum, said stitchers being angularly disposed to the transverse plane of the drum, and means for reciprocating said stitchers across the drum to stitch and roll the fabric strips laterally along the drum as the latter is rotated, to consolidate the fabric strips into convolute plies.

5. Apparatus for building endless fabric ply belts, comprising a rotatable drum adapted to have fabric strips applied circumferentially thereabout, a plurality of stitchers mounted to reciprocate longitudinally across the drum and approximately in engagement with said drum, said stitchers being angularly disposed to the transverse plane of the drum, and means for reciprocating said stitchers across the drum to stitch and roll the fabric strips laterally along the drum as the latter is rotated, to consolidate the fabric strips into convolute plies.

6. Apparatus for building endless fabric ply belts, comprising a rotatable drum adapted to have fabric strips applied circumferentially thereabout, and means reciprocable axially of the drum to stitch and roll the fabric strips laterally along the drum as the latter is rotated to consolidate the fabric strips into convolute plies.

7. Apparatus for building endless fabric ply belts, comprising a rotatable drum adapted to have a fabric band applied circumferentially thereabout, a plurality of stitchers mounted to reciprocate longitudinally across the drum and approximately in engagement with said drum, said stitchers being angularly disposed to the transverse plane of the drum, and means for reciprocating said stitchers across the drum to stitch and roll the fabric band laterally along the drum as the latter is rotated to consolidate the fabric band into convolute plies.

8. Apparatus for building endless fabric ply belts, comprising a rotatable drum adapted to have a fabric band applied circumferentially thereabout, and means reciprocable axially of the drum to stitch and roll the fabric band laterally along the drum as the latter is rotated to consolidate the fabric band into convolute plies.

9. Apparatus for building endless laminated fabric belts, comprising a rotatable drum adapted to have a plurality of fabric strips applied circumferentially thereabout, and stitching means, movable along the surface of the drum as the latter is rotated, to roll and stitch an initial strip upon itself to form a core and to roll and stitch each succeeding strip about said core.

10. Apparatus for building endless laminated fabric belts, comprising a rotatable drum, means for guiding a plurality of fabric strips circumferentially about said drum in axially spaced relation thereon, and a stitcher movable longitudinally of the drum and approximately in engagement therewith to stitch and roll an initial fabric strip laterally upon itself to form a core and to roll said core laterally along the drum to stitch the successive strips about the core in a plurality of convolute plies as the drum is rotated.

11. Apparatus for building endless laminated fabric belts comprising a rotatable drum adapted to have a band of fabric wrapped thereabout, and a stitcher movable longitudinally of the drum and approximately in engagement therewith to stitch and roll the fabric band laterally upon itself along the drum in a plurality of convolute plies as the drum is rotated.

12. Apparatus for building endless laminated fabric belts, comprising a rotatable drum, means for guiding a plurality of fabric strips circumferentially about said drum in axially spaced relation thereon, and means movable longitudinally of the drum to stitch and roll an initial fabric strip laterally upon itself to form a core and to roll said core laterally along the drum to stitch the successive strips about the core in a plurality of convolute plies as the drum is rotated.

13. Apparatus for building endless laminated fabric belts, comprising a rotatable drum adapted to have a band of fabric wrapped thereabout, and means movable longitudinally of the drum to stitch and roll the fabric band laterally upon itself along the drum in a plurality of convolute plies as the drum is rotated.

14. Apparatus for building endless laminated fabric belts, comprising a rotatable drum, means for guiding a plurality of fabric strips circumferentially about said drum in axially spaced relation thereon, and means to stitch and roll an initial fabric strip laterally upon itself to form a core and to roll said core laterally along the drum to stitch the successive strips about the core in a plurality of convolute plies as the drum is rotated and to consolidate the plies as the belt is rolled along the drum in between the strips of fabric.

15. Apparatus for forming endless belts, comprising a rotatable drum adapted to have a fabric band applied circumferentially thereabout, a mold ring detachably secured to the outer end of the drum, and means to roll the fabric laterally upon itself along the drum and onto the mold ring.

16. Apparatus for forming endless belts, comprising a rotatable drum adapted to have a fabric band applied circumferentially thereabout, and a rotatable disc reciprocable longitudinally of the drum for progressively turning the fabric upon itself and for rolling the same laterally along the drum as the latter is rotated, said disc being tilted to overhang the fabric and the disc being turned at an angle to the circumference of the drum to present a side surface of the disc at an acute angle to the edge of the fabric.

17. Apparatus for forming endless belts, comprising a rotatable drum adapted to have a fabric band applied circumferentially thereabout, and a member having a surface directed at an acute angle to the edge of the fabric to roll the latter upon itself as the drum is rotated with respect to said member.

18. Apparatus for forming endless belts, comprising a rotatable drum adapted to have a fabric band applied circumferentially thereabout, and a member movable across the drum progressively to roll the fabric upon itself as the drum is rotated, the member having a surface presented against the fabric at an angle to the edge thereof, the trailing portion of the surface being advanced toward the fabric farther than the leading portion.

19. Apparatus for forming endless belts, comprising a rotatable drum adapted to have a fabric band applied circumferentially thereabout, and a rotatable disc reciprocable longitudinally of the drum for progressively turning the fabric upon itself and for rolling the same laterally along the drum as the latter is rotated, said disc being tilted to overhang the fabric.

20. Apparatus for forming endless belts, comprising a rotatable drum adapted to have a fabric band applied circumferentially thereabout, and a rotatable disc reciprocable longitudinally of the drum for progressively turning the fabric upon itself and for rolling the same laterally along the drum as the latter is rotated, said disc being turned at an angle to the circumference of the drum to present a side surface of the disc at an acute angle to the edge of the fabric.

WILLIAM P. VACHON.